May 27, 1958    L. MYERS    2,836,132
ICE CREAM DISHER WITH ANGULAR HANDLE
Filed Feb. 17, 1956
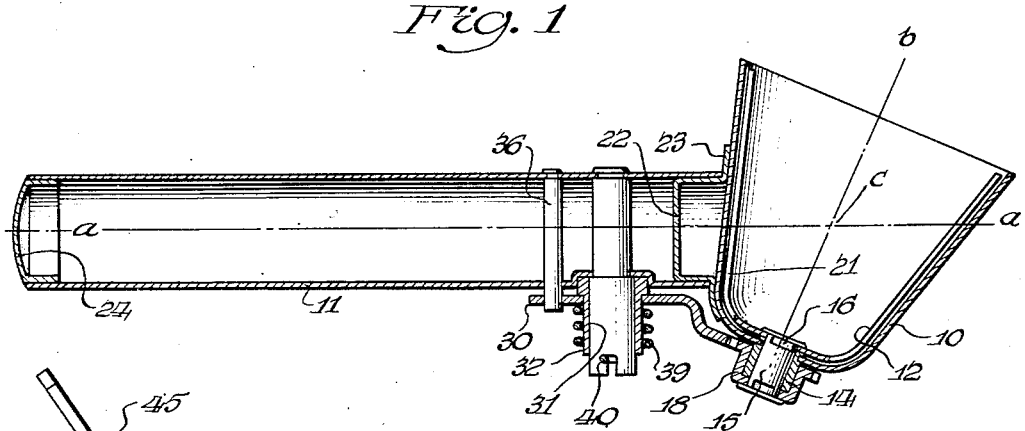
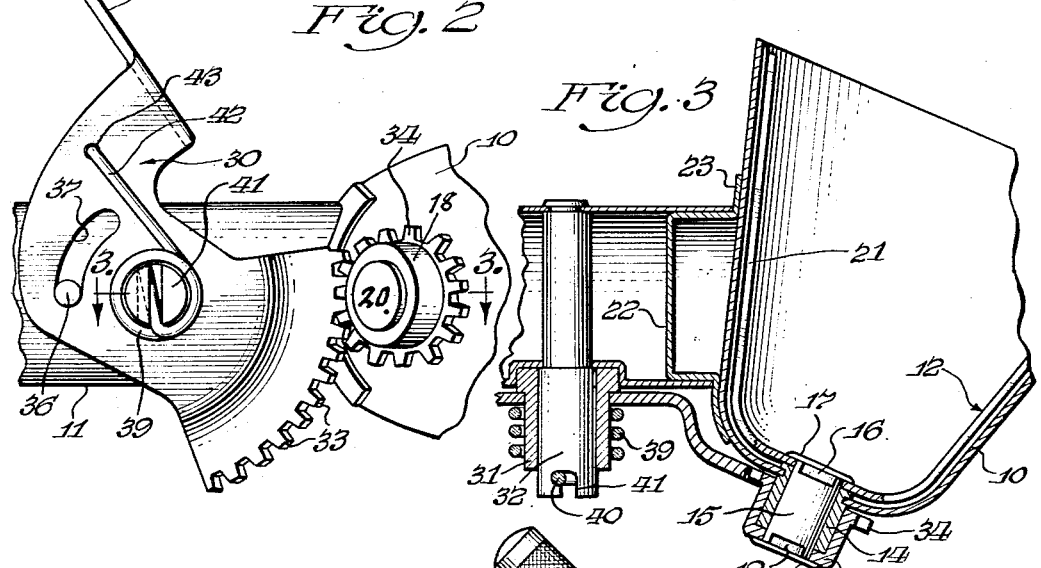
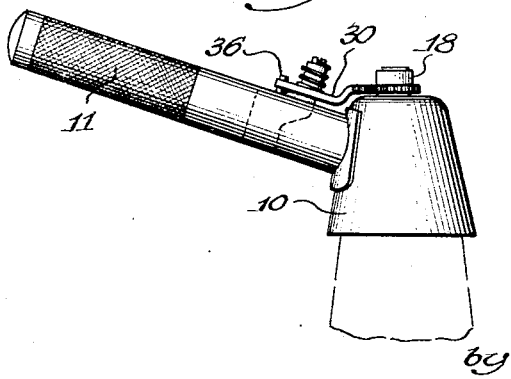
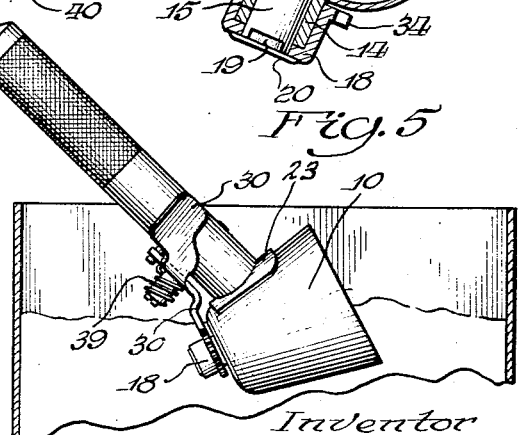
Inventor
Louis Myers
Fred Gerlach
his Attorney

United States Patent Office 2,836,132
Patented May 27, 1958

2,836,132

ICE CREAM DISHER WITH ANGULAR HANDLE

Louis Myers, Rockford, Ill.

Application February 17, 1956, Serial No. 566,131

1 Claim. (Cl. 107—48)

The invention relates to ice cream dishers.

One object of the invention is to provide an ice cream disher of the type which comprises a bowl with a scraper mounted to rotate on an axis which is concentric with the axis of the bowl, a handle projecting from one side of the bowl on an axis which is co-related to the axis of the bowl for loading of the bowl with ice cream from a receptacle containing bulk ice cream with facility and ease, and mechanism for rotating the scraper in the bowl.

Another object of the invention is to provide an ice cream disher of this type in which the axes of the bowl and handle are co-related for discharging the ice cream from the bowl with ease and without contact of the hand of the user with the ice cream or material in the dish or saucer onto which the ice cream is being discharged.

Other objects will appear from the detailed description.

The invention consists in the several novel features hereinafter described and more particularly defined by the claim at the conclusion hereof.

In the drawings:

Fig. 1 is a longitudinal section of an ice cream disher embodying the invention;

Fig. 2 is a bottom plan view of the scraper-operating mechanism;

Fig. 3 is a section taken on line 3—3 of Fig. 2;

Fig. 4 is a side elevation of the disher exemplifying its position while it is being loaded from a can containing bulk ice cream; and Fig. 5 is a side elevation illustrating the disher inverted for discharging ice cream from the bowl.

The invention is exemplified in a disher which comprises a conical bowl 10, a handle 11 fixed to and extending longitudinally from one side of the bowl, and a scraper 12 which is journalled in the apex of and co-axially rotatable in the bowl. The bowl 10 has secured thereto, for example by brazing or soldering, a cylindrical bearing-sleeve 14 which projects outwardly from the apex of the bowl and has a bore coaxial with the axis of the bowl. A stud or spindle 15 extends through and is journalled in sleeve 14, has its end inside of the bowl fixedly secured to the scraper 12, for example, by segmental shoulders 16 and a rivet head 17 which secures the center of the scraper on said shoulders. A gear 18 of cup-shaped cross section is fitted and seated on segmental shoulders 19 on the stud 15 and riveted thereon by a head 20 on the outer end of said stud. The scraper 12 includes diametrically opposite divergent arms 21 which conform to the conical contour of the inner periphery of the bowl for severing and discharging the ice cream from the bowl.

The handle 11 consists of a substantially straight section of cylindrical metal tubing in one end of which a stamped socket 22 is secured by brazing or soldering. The socket 22 has a marginal integral flange 23 which fits and is secured by brazing or soldering to the conforming portions of the outer surfaces of the conical bowl.

The outer end of handle 11 is closed by a cap 24. The axis of the handle 11 is indicated by broken line a—a and the axis of the bowl is indicated by the broken line b—b. By reference to said lines it will be understood that these axes intersect at c at the center of the bowl, that the axis of the handle is acutely angled relatively to the portion of the axis of the bowl between the apex end of the bowl and the handle, that the edge of the mouth or enlarged end of the bowl lies in a plane at a right angle to the axis of the bowl and is obtusely angled relatively to the axis of the handle. This results advantageously in manipulating the disher during loading or discharge of the ice cream, as hereinafter described.

Mechanism for rotating the pinion or gear 18, stud 15 and scraper 12 for releasing the ice cream from the bowl, comprises: a lever 30 which has a bearing-sleeve 31 fixedly secured thereto; a spindle 32 which extends transversely across the tubular handle 11, is riveted at one of its ends to the tubular wall of the handle and on which the sleeve 31 and lever 30 are journalled; an arcuate series of gear teeth 33 on lever 30; and a series of teeth 34 on pinion 18 which mesh with the teeth 33 on lever 30. A stop-pin 36 is riveted in handle 11 and extends through an arcuate slot 37 in lever 30 for limiting the pivotal stroke of the scraper 12. A torsion-spring for retracting lever 30 and scraper 12 comprises a coil 39 around sleeve 31, a terminal 40 removably held in a cross-groove 41 in spindle 32, and a terminal 42 removably held in a hole 43 in lever 30. A finger-piece or member 45 extends angularly from lever 30 and is adapted to be pressed by the user toward handle 11 against the force of the spring for swinging said lever to rotate scraper 12 in bowl 10. The finger-piece 45 and portion of lever 30 adjacent the pintle 32 are pivoted to swing in a plane transversely of the handle and the portion of lever 30 provided with teeth 33 and meshing with gear 18 is offset relatively to the portion of the lever adjacent the handle so that one member of lever 30 will swing in a plane transversely to the handle and the toothed end of the lever will swing in a plane parallel to the gear teeth 34 on gear 18 which rotates coaxially with the scraper 12 or the axis of bowl 10, or at a right angle to the axis of the bowl. In loading the disher of this construction, the handle 11 is gripped by one hand of the user, the bowl is inserted into the bulk ice cream in a can d, approximately in the angular relation of the axes of the bowl and the handle, shown in Fig. 4, and the mouth or large end of the bowl is moved horizontally to scoop the ice cream into the bowl until it is fully loaded. The axis of the bowl is disposed at a low angle relatively to the horizontal plane so that lateral movement of the mouth of the bowl into the ice cream will easily scoop the ice cream from the bulk in the can into the bowl and the axis of the handle will be approximately at an angle of 45 degrees to the horizontal for a convenient swinging movement to load the bowl. This results from the angular relation of the axes of the bowl and the handle because the plane of the mouth of the bowl is at an acute angle to the axis of the handle and at a more advantageous angle for scooping the ice cream into the bowl. For example, if the plane of the mouth of the bowl and the axis of the handle are at right angles to each other, it would be necessary to hold the handle at a higher and less convenient vertical angle for presentation of the mouth of the bowl at the same angle to the ice cream. This higher angle renders the scooping of the ice cream more inconvenient. In discharging the ice cream from the bowl, it is usually delivered into a serving dish or receptacle and the optimum position for this purpose is when the bowl is inverted and its mouth faces downwardly and its edge lies nearly in a horizontal plane and the axis of the bowl is vertical, as indicated in Fig. 5. The axis of the handle 30 extends upwardly and laterally away from the dish into which the mass is delivered so that the users hand gripping the outer end of the handle has more clearance above the dish or material in the dish than when the axis of the handle is at a right angle to the axis of the bowl. This tends to avoid contact of the fingers of the user with the material or ice cream previously deposited in the dish. The terminals 40 may be unhooked from groove 41 and terminal 42 may be disconnected from lever 30 for removal of the torsion spring and the removal of the lever 30 from spindle 32 in the event replacement of the lever is desired.

The invention is not to be understood as restricted to the details set forth since these may be modified within the scope of the appended claims without departing from the spirit and scope of the invention.

Having thus described the invention what I claim as new and desire to secure by Letters Patent is:

An ice cream disher comprising: a bowl having an open mouth at one end and a bottom at its other end, said mouth and bottom being coaxial, the mouth having a rim extending in a plane substantially at a right angle to said axis, a handle projecting rectilinearlly from one side of the bowl on an axis in a transverse plane at an obtuse angle to the plane of the rim of the bowl, a sleeve secured in the bottom end of and coaxial with the bowl, a scraper provided with a stud journalled in and extending through said sleeve, a pinion having a tubular hub concentrically surrounding the side and abutting the outer end of said sleeve and secured to the outer end of said stud, a lever, a stud on the handle on which the lever is pivoted to swing transversely in a plane at an obtuse angle to the plane of the rim, and an offset on the lever provided with teeth meshing with the pinion to swing transversely in a plane at a right angle to the axis of the pinion and the bowl.

References Cited in the file of this patent

UNITED STATES PATENTS

| | | |
|---|---|---|
| 571,170 | Pfeiffer | Nov. 10, 1896 |
| 714,440 | Bolland | Nov. 25, 1902 |
| 833,620 | Nielsen | Oct. 16, 1906 |
| 1,205,396 | Ross | Nov. 21, 1916 |
| 1,748,204 | Cambell | Feb. 25, 1930 |
| 2,129,753 | Wilhoit | Sept. 13, 1938 |
| 2,761,399 | Gordon | Sept. 4, 1956 |